United States Patent
Mezheritsky et al.

[11] Patent Number: 5,904,121
[45] Date of Patent: May 18, 1999

[54] WATER/FUEL MIXING SYSTEM FOR A DIESEL ENGINE

[75] Inventors: Anatoly D. Mezheritsky, Vancouver, Canada; Edward M. Halimi, Montecito, Calif.

[73] Assignee: Turbodyne Systems Inc., Carpinteria, Calif.

[21] Appl. No.: 08/781,543

[22] Filed: Jan. 9, 1997

[51] Int. Cl.⁶ .................................................. F02B 47/02
[52] U.S. Cl. ......................................... 123/25 C; 123/25 J
[58] Field of Search ............................... 123/25 A, 25 R, 123/25 C, 25 J, 25 K, 25 L, 25 M, 25 N

[56] References Cited

U.S. PATENT DOCUMENTS

| | | | |
|---|---|---|---|
| 4,122,803 | 10/1978 | Miller | 123/25 C |
| 4,279,223 | 7/1981 | Csonka et al. | 123/25 C |
| 4,351,289 | 9/1982 | Renda | 123/25 K |
| 4,476,817 | 10/1984 | Lindberg | 123/25 J |
| 5,245,953 | 9/1993 | Shimada et al. | 123/25 C |
| 5,535,708 | 7/1996 | Valentine | 123/25 C |
| 5,542,379 | 8/1996 | Kessler | 123/25 C |

*Primary Examiner*—Erick R. Solis
*Attorney, Agent, or Firm*—Brinks Hofer Gilson & Lione

[57] ABSTRACT

NOx emissions from diesel engines are reduced by mixing water in the diesel fuel to reduce combustion temperatures. The water is proportionately mixed into the diesel fuel and the mixture is injected into the cylinders. When the engine is not operating, the water separates from the diesel fuel and causes rusting. In accordance with this invention, the mixing of water into the diesel fuel is terminated before the engine is shut off so diesel fuel purges the system of the water/diesel fuel dispersion so that there no longer is water in the diesel fuel supply system by the time the engine is stopped.

20 Claims, 1 Drawing Sheet

WATER/FUEL MIXING SYSTEM FOR A DIESEL ENGINE

FIELD OF THE INVENTION

This invention is directed to supplying a diesel engine with mixed water/diesel fuel in a constant ratio to markedly reduce undesirable emissions in the exhaust from the diesel engine and save fuel, but terminating the water introduction before stopping the engine to reduce downtime engine corrosion.

BACKGROUND OF THE INVENTION

Air pollution is a major problem in most urban areas. It is a fact that air pollution is the major problem currently facing the automobile industry. The main air pollutants from diesel engine exhaust gas are carbon monoxide (CO), nitrogen oxides (NOx), carbon dioxide ($CO_2$), hydrocarbons (HC) and particulate matter (PM). The dangers of NOx, CO and hydrocarbons to both the environment and general population are well known. Now NOx is treated as an ozone precursor. This certainly means more stringent controls for NOx. Federal, state and local regulators regularly lower the permissible level for NOx. Therefore, NOx remains the main problem to be solved, and to a certain extent, attention must also be paid to carbon monoxide and particulate matter which causes opacity.

NOx remains a problem pollutant. It can be reduced by exhaust gas recirculation (EGR), but such recirculation has a number of disadvantages including major engine wear from sulfuric acid derived from the sulphur inherent on fuels; contamination of the lubricant from soot particles; and increased specific diesel fuel consumption. It is seemingly evident that EGR cannot resolve the problem of lowering NOx formation without affecting engine performance and reliability.

Another way of reducing exhaust gas NOx emissions is cooling the combustion by introducing water into the combustion. This has been tested and found to result in decreased NOx production. Introduction of water into the diesel fuel has been attempted in two ways in the past. The first was to emulsify the water into the diesel fuel. This requires special chemicals, such as wetting agents. In addition, a special pump and a mixer are required. Another method is direct injection of the water into the cylinder. In very large engines, such as marine engines, separate injectors are employed. In this case, the water injection system is a substantial duplicate of the already existing diesel fuel injection system and is controlled in a similar manner. A more recently developed system includes the injection of the diesel fuel and the water into the cylinder with the same injector. The two liquids are layered in the injector and are sequentially injected. This is a sophisticated system which requires a considerable amount of attention, and is suitable only for those large engines where there are competent engine operators present, such as in marine and large stationary engine installations.

The disadvantages of water injection systems as tested in diesel engines using a water/diesel fuel mixture include corrosion of the diesel fuel pump, diesel fuel injectors and connecting tubing. When water is directly injected into the cylinders under high pressure, it also results in increased cylinder wear. The provision of separate water injectors in diesel engines increases the cost of an engine and results in more complicated operation, increased maintenance costs, and reduced engine reliability. However, the employment of water in diesel engine operation does reduce its NOx output and, thus, would be desirable if the disadvantages could be overcome.

The present invention has been developed from a thorough analysis of the nature of exhaust gas emissions formation. The main goals of this invention consist in providing a system which does not require emulsification or special injectors, but provides a system wherein a simple mixer provides the proper water/diesel fuel mixture. The mixer and the conventional fuel pump supplying the injectors mix into the diesel fuel a small quantity of water in a known water/diesel fuel ratio. This water/diesel fuel mixture starts mixing in a special mixing chamber before the mixture comes to the fuel pump where the liquids are further mixed. The mixture then goes to the diesel injectors and then to the cylinders. Only a small water tank, the above-mentioned mixing chamber, a small mixed water/diesel fuel return tank and control sensors are required in addition to the existing equipment.

SUMMARY OF THE INVENTION

In order to aid in the understanding of this invention, it can be stated in essentially summary form that it is directed to a diesel engine which includes separate supplies of diesel fuel and water, with means to mix the water into the diesel fuel as the diesel fuel is distributed to the engine, to maintain a proper water/diesel fuel ratio and means to terminate the water supply to the water/diesel fuel mixer prior to engine shutdown so that, when the engine is shut down, there is no water beyond the mixer which may separate and cause corrosion in the diesel fuel system.

It is, thus, a purpose and advantage of this invention is to provide a diesel engine system which includes the mixing of water into the diesel fuel supply, but terminates the water flow before the engine is stopped in order to prevent water problems in the engine when the engine is not operating, and to control constant water/fuel ratio into the return fuel line.

It is a further purpose and advantage of this invention is to provide a water/diesel fuel mixing system for a diesel engine which permits the addition of water to diesel fuel during engine operation, but turns off the water supply prior to engine shutdown so that engine operation after the turning off of the water supply purges the water from the fuel system so that there is no water in the engine system during shutdown to avoid corrosion in the fuel system.

It is another purpose and advantage of this invention to provide a water/diesel fuel mixing system for a diesel engine, together with means for terminating the water flow before engine shutdown and to control water/fuel ratio in the return fuel line.

The features of the present invention which are believed to be novel are set forth with particularity in the appended claims. The present invention, both as to its organization and manner of operation, together with further objects and advantages thereof, may be best understood by reference to the following description, taken in conjunction with the accompanying drawing.

DESCRIPTION OF THE PREFERRED EMBODIMENT

Figures 1, 2:
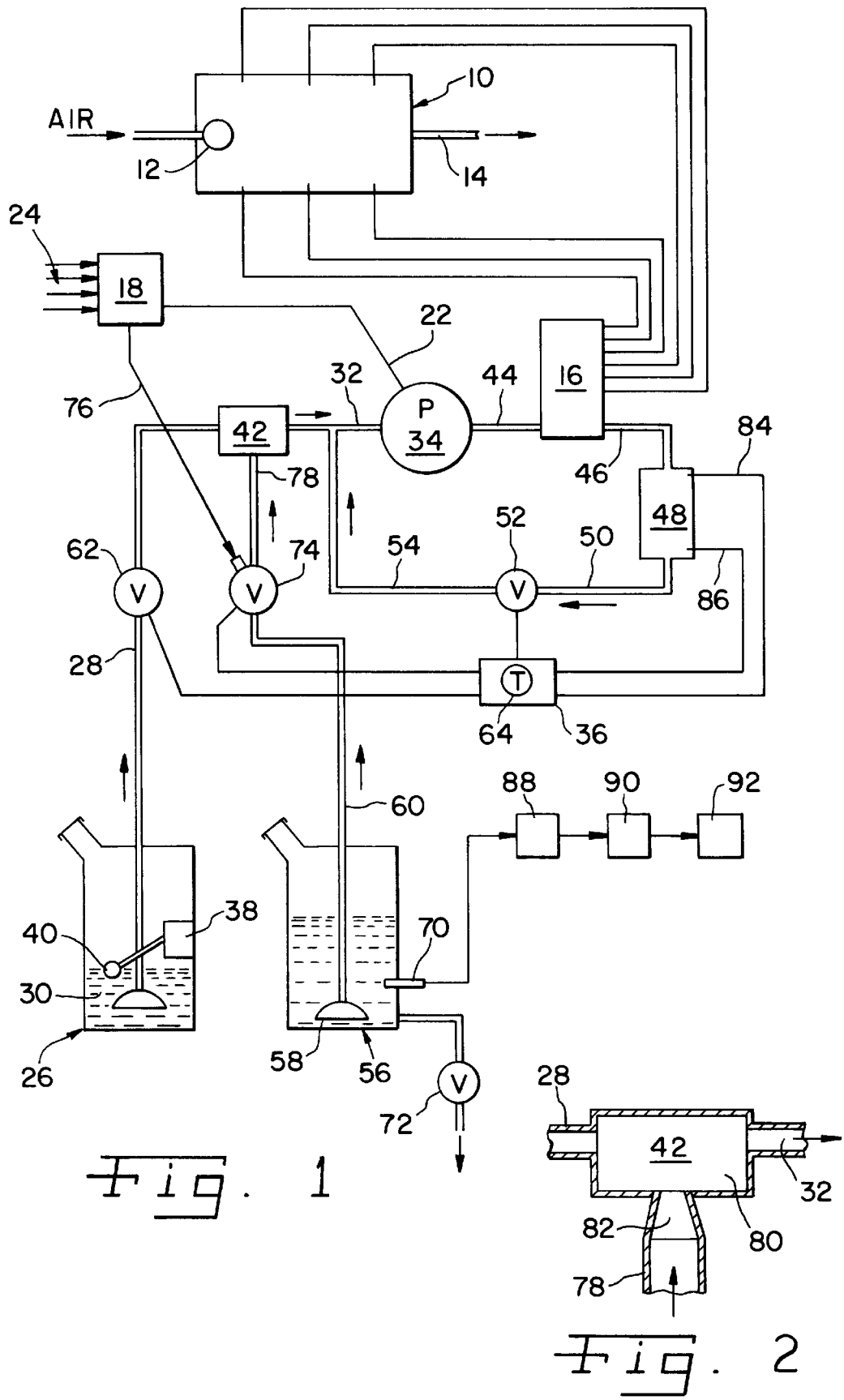
FIG. 1 is a schematic diagram of an injected diesel engine having the water/diesel fuel mixing and water cutoff system of this invention.
FIG. 2 is a longitudinal section through the mixer for providing the water/diesel mixture.

A six-cylinder diesel engine is generally indicated at 10 in FIG. 1. The intake air may be supplied by an electric motor-driven and/or exhaust gas turbine-driven air compressor through an air cleaner 12. Rotating shaft power is taken out of the engine at shaft 14 and is used to power a powered device. The engine has a multiport diesel fuel injector pump 34, which has an illustrated fuel injection line connected to an injector in each cylinder. The diesel fuel pump 34 is controlled by engine controller 18 via respective controller line 22. The engine controller 18 receives signals on input signal lines, indicated generally at 24, from various relevant sources, including demand, engine speed, engine temperature, and the like. The output from the engine controller 18 manages the diesel fuel to the cylinders to produce the desired speed of shaft 14.

Diesel fuel tank 26 has a suction line 28 with a suction screen 30 thereon. Suction line 28 is connected through valve 62, proportioning mixer 42 and line 32 to diesel fuel pump 34. The diesel fuel pump 34 delivers diesel fuel through line 44 to fuel collector 16. Fuel gage 38 is controlled by a float 40 in the tank 26 and indicates the amount of diesel fuel in the tank.

In order to reduce the combustion temperature in the cylinders of engine 10, water is mixed with the diesel fuel. Water tank 56 contains suction screen 58 connected to water suction line 60. The suction line 60 is connected through valve 74 and suction line 78 to mixer 42. The valve 74 is controlled from engine controller 18 through signal line 76. In order to assure that there is water in tank 56, low water sensor 70 provides a signal as is described below. In cold weather, the water in the tank 56 may freeze causing damage to the tank, pump and gage. In order to avoid this, a temperature responsive drain valve 72 is connected to the bottom of water tank 56. The valve 72 opens when freezing temperatures are incurred. This dumps the remaining water in the tank 56 to avoid freezing damage.

In accordance with this invention, shutoff valve 74 is provided in line 60. Shutoff valve 74 preferably is an electrically operated solenoid valve controlled by an electrical signal in signal line 76 from engine controller 18. When valve 74 is open, water passes through line 78 to mixer 42.

FIG. 2 is a longitudinal section through the mixer 42. It is taken on the center line of the diesel fuel inlet line 28, mixture outlet line 32 and water line 78. It shows that the mixer 42 has a mixing chamber 80 to which the diesel fuel inlet line 28 is directly connected. The water line 78, however, has a convergent inlet nozzle 82 at its inlet to the mixing chamber 80. This inlet nozzle 82 turbulently mixes the water with the diesel fuel so that there is a water/diesel fuel mixture in the outlet line 32. The valve 74 is positioned closely to nozzle 82 to avoid spillage of unwanted water beyond the valve into the mixer. The water/diesel mixture lines 32 and 44 are as short as possible to minimize the volume thereof.

The mixer is configured so that water is introduced into the diesel fuel in an amount between 5 and 20 percent by weight, depending on the type of engine. The amount of diesel fuel added to the mixer is between 95 and 80 percent by weight. For a particular engine, the water-to-diesel fuel ratio is fixed and is controlled by the flow in diesel fuel line 28, water line 78, and the configuration of mixer 42. The mixer 42 turbulently distributes water droplets into the diesel fuel. During normal flow, this mixture passes from the mixer 42 through line 32 to a fuel pump 34 where the water is thoroughly mixed in the fuel by pump action. From pump 34 the water/diesel fuel mixture passes through line 44 and, thence, to the engine for combustion.

All diesel engines have an excess diesel fuel line which delivers the excess diesel fuel back to the diesel fuel tank 26. However, in the preferred embodiment illustrated, the fuel through excess fuel line 46 is captured in an excess water/diesel mixture tank 48 which has a fuel output line 50 connected at the tank bottom for delivering the excess fuel through fuel line 54 back to line 32. Valve 52 is provided in the return flow line.

The valve 52 is controlled by the high and low fuel/water mixture level sensors 84 and 86 in tank 48. These sensors are connected to control unit 36 which opens valve 52 when the liquid level in tank 48 is high enough to actuate sensor 84 and opens the valve 52 only when the pump 34 is running. At the same time controller 36 opens valve 52, it closes valves 62 and 74 so that the entire pump suction is drawn from the excess diesel/water fuel mixture tank 48.

The valve 52 remains open and valves 62 and 74 remain closed until the flow level sensor 86 indicates that tank 48 is almost empty. When the excess tank 48 has its level drawn down to the lower sensor 86, the valve 52 is closed and valves 62 and 74 are opened. In this way, the excess diesel/water mixture is again returned to the excess tank 48.

If the engine was shut down without preparation, there would be a water/diesel fuel mixture throughout the system from mixer 42 on through diesel fuel pump 34, and through the engine injectors. If the engine is not to be operated for some time (for example, 24 hours), the water separates from the diesel fuel and can cause corrosion. It is to overcome this problem that the valves 74, 52 and 62 are provided.

Based on the logic of this invention, when an operator sends a signal to shut off an engine, the engine controller 18 will send a signal to the timer 64 "T" integrated in the controller 36. The timer "T" is pre-set for a certain period of time (from 15 to 30 sec. depending on the type of engine). During this pre-set time the engine will continue to operate in the following way: both valves 52 and 74 will be closed and valve 62 will be opened (during pre-set time all the control will pass through the timer 64 "T" only). Thus, during this time no water will be supplied to the diesel fuel system so that the pure diesel fuel purges the system downstream of mixer 42. Instead of using a timer signal to close valves 52 and 74, other appropriate signals could be used. For example, the motion of the vehicle in which the diesel engine is installed would be sensed and, when that motion ceased, the valves could be closed. Another signal which would be useful in terminating water flow would be a manual signal from an operator. This is especially useful in association with a stationary engine. Thus any one or more of the multiplicity of signals could be used for this purpose.

The water-to-fuel mixing system for a diesel engine or for a gasoline engine with fuel injection works as follows. In normal operation the fuel pump 34 draws fuel through open valve 62 from the fuel tank 26 and water from water tank 56 through open valve 74 into the mixer 42. In the mixer 42 the water/fuel ratio is established due to a certain diameter of converging nozzle. Such an arrangement ensures automatically constant water-to-fuel ratio being initially installed at any engine load. The mixer 42 is configured so that the proper water/fuel mixture is achieved by the size of the passages into the mixer. In pump 34 the water is dispersed into the diesel fuel to provide a water/fuel mixture in line 44 which is finally injected into engine cylinders.

Simultaneously an excess of water/fuel mixture from engine injectors returns through line 46 (usually called a return fuel line) to an excess fuel/water tank 48. An electronic-solenoid valve 52 normally is closed until the fuel/water flow level reaches a permissible maximum controlled by sensor 84. At that moment an electronic signal closes both valves 62 and 74 and opens valve 52 so that the entire pump suction is drawn from the excess fuel/water mixture tank 48. When the tank 48 has its level drawn down to the lower sensor 86, the valve 52 is closed and valves 62 and 74 are opened. In this way, the excess fuel/water mixture is again returned to the tank 48.

When an engine is shut off, the control signal is controlled by a timer 64 as described above.

It is recognized that the pollution-reduction benefits of this inventive system are dependent on the availability of water in water tank 56, and further that some users might not refill the water tank 56 when it becomes empty, since obviously the engine 10 will operate on just diesel fuel. Accordingly, in keeping with this invention and its objectives, a system is provided for shutting off the engine 10 when water tank 56 is approaching the empty condition or is empty. As seen in FIG. 1, low water sensor 70 is connected to a warning light/buzzer 88 for providing a visible/audible signal to the operator when tank 56 is approaching the empty condition or is empty. Similarly, a timer 90 is connected to receive an actuating signal at the same time as the light/buzzer 88 so that, after a period of time such as, for example, 5 minutes, the timer 90 actuates kill circuit 92 for causing engine shutdown.

This invention has been described in its presently contemplated best mode, and it is clear that it is susceptible to numerous modifications, modes and embodiments within the ability of those skilled in the art and without the exercise of the inventive faculty. Accordingly, the scope of this invention is defined by the scope of the following claims.

What is claimed is:

1. A water/diesel fuel mixing system for a diesel engine, comprising:

a diesel fuel delivery system for delivering diesel fuel to a diesel engine;

a diesel fuel tank for storing diesel fuel, a pump for withdrawing diesel fuel from said tank and delivering diesel fuel through a diesel fuel line to said diesel fuel delivery system;

a proportioning mixer positioned between said diesel fuel tank and said pump, said proportioning mixer being connected via said diesel fuel line to receive diesel fuel from said diesel fuel tank, and to deliver liquid to said diesel fuel delivery system;

a fuel valve installed between said diesel fuel tank and said proportioning mixer;

a water tank for storing water, a water line connecting said tank to said proportioning mixer such that said proportioning mixer receives a flow of water from said water tank, a valve in said water line to stop said flow of water to said proportioning mixer; and an engine controller, said engine controller being connected to said diesel fuel delivery system for delivering diesel fuel to the engine in accordance with engine demand, said engine controller also being connected to said water valve to terminate water flow to said proportioning mixer prior to engine shutdown so that said diesel fuel delivery system is purged of water before engine shutdown.

2. The system of claim 1 wherein water is mixed into the diesel fuel in said proportioning mixer in a ratio of from 5 to 20 percent by weight water.

3. The system of claim 1 wherein said water line connecting said water tank to said proportioning mixer includes a convergent nozzle at a connection between said water line and said proportioning mixer for delivering water into said mixer at a high velocity to turbulently mix the water with the diesel fuel in the mixer.

4. The system of claim 1 wherein said diesel fuel delivery system has an excess diesel fuel outlet line and said excess diesel fuel outlet line is connected to the inlet of said diesel fuel pump.

5. The system of claim 1 wherein said diesel fuel delivery system has an excess diesel fuel outlet line and there is an excess water/diesel fuel return tank connected to receive excess diesel fuel from said excess diesel fuel outlet line.

6. The system of claim 5 wherein said excess water/diesel fuel return tank is connected to deliver excess water/diesel fuel mixture back through a return line to said mixed diesel fuel delivery system.

7. The system of claim 6 wherein the excess water/diesel fuel mixture return tank includes at least one level sensor to signal the level of water/diesel fuel mixture in said return tank.

8. The system of claim 7 wherein said at least one level sensor comprises a high level sensor and a low level sensor, and wherein there is a return valve in said return line, and said level sensors are connected to said valve to deliver excess water/diesel fuel mixture back to said mixed water/diesel fuel line when the engine is running and when said high level sensor signals the presence of excess water/diesel fuel mixture in said tank.

9. The system of claim 8 wherein said low level sensor closes said return valve in said return fuel/water line when there is no fuel/water mixture in said mixture return tank.

10. The system of claim 8 wherein said water valve is a solenoid valve connected to be electrically operated by an electrical signal from said engine controller and from said level sensors.

11. The system of claim 10 wherein said water valve and return valve are closed when said engine controller controls the engine to be shutting off.

12. The system of claim 1 wherein said mixer mixes water into diesel fuel at a proportion of 5 to 20 percent water to 95 to 80 percent diesel fuel by weight.

13. The system of claim 1 wherein said mixer has a mixing chamber and said water line has therein a converging nozzle connected to deliver water at high velocity into said mixing chamber.

14. The system of claim 1 wherein said water tank has a level sensor therein and said level sensor is connected to provide a signal to the engine operator to indicate when the water level in said water tank is low.

15. The system of claim 14 including a warning light/buzzer for the engine operator, and said level sensor is connected to actuate said warning light/buzzer when said water tank becomes empty.

16. The system of claim 15 including a timer and an engine kill circuit, said level sensor being connected to actuate said timer at the same time said warning light/buzzer is actuated, and said timer being connected to actuate said engine kill circuit after a given period of time has expired.

17. The system of claim 1 wherein said water flow control valve is closed when said engine controller controls the engine to be idling.

18. The method of operating a diesel engine having a diesel fuel tank and a fuel delivery system for delivering diesel fuel to the cylinders of the diesel engine comprising the steps of:

providing a water tank and means to supply water from said water tank;

providing a water/diesel fuel mixer between the diesel fuel tank and the diesel fuel delivery system;

mixing water into the flow of diesel fuel to provide a water/diesel fuel mixture for delivery to the diesel fuel delivery system for combustion in the engine; and terminating the flow of water to the mixer before the stopping of the engine so that the water/diesel fuel mixture between the mixer and the engine is purged by a flow of unmixed diesel fuel before the engine is stopped.

19. The method of claim 18 wherein a valve is provided in the flow path of water to the mixer and the flow of water is terminated by closing the valve.

20. The method of claim 18, wherein the diesel engine has an engine controller which controls the fuel delivery system to the engine, and the controller is also connected to control the water valve so that the terminating step is actuated by the engine controller.

* * * * *